Jan. 10, 1933.  F. HOLMES  1,893,550
ELECTRICITY METER SERVICE INSTALLATION
Original Filed May 14, 1930   3 Sheets-Sheet 3
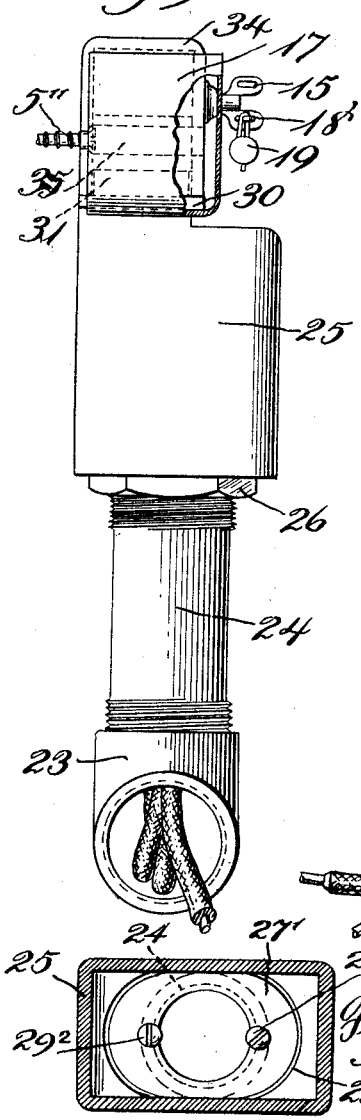
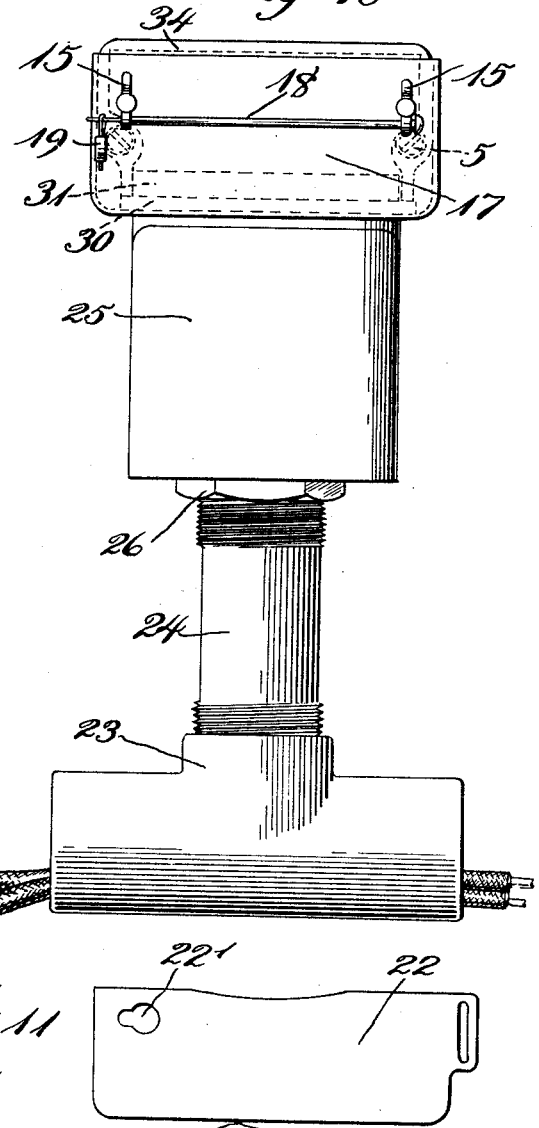
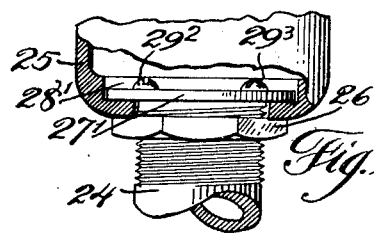
Inventor
Frederick Holmes
By Henry P. Bright
Attorney Patented Jan. 10, 1933

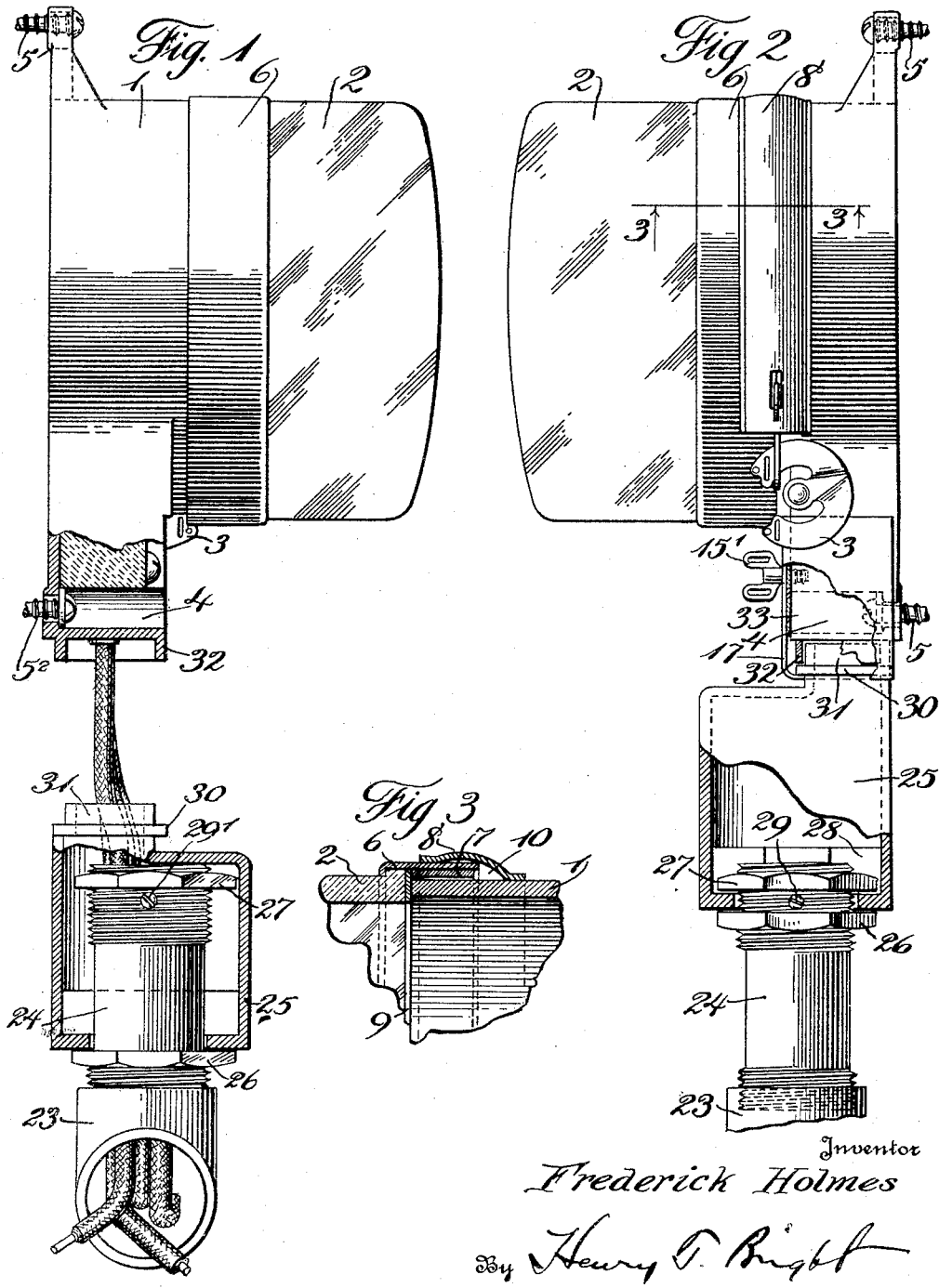

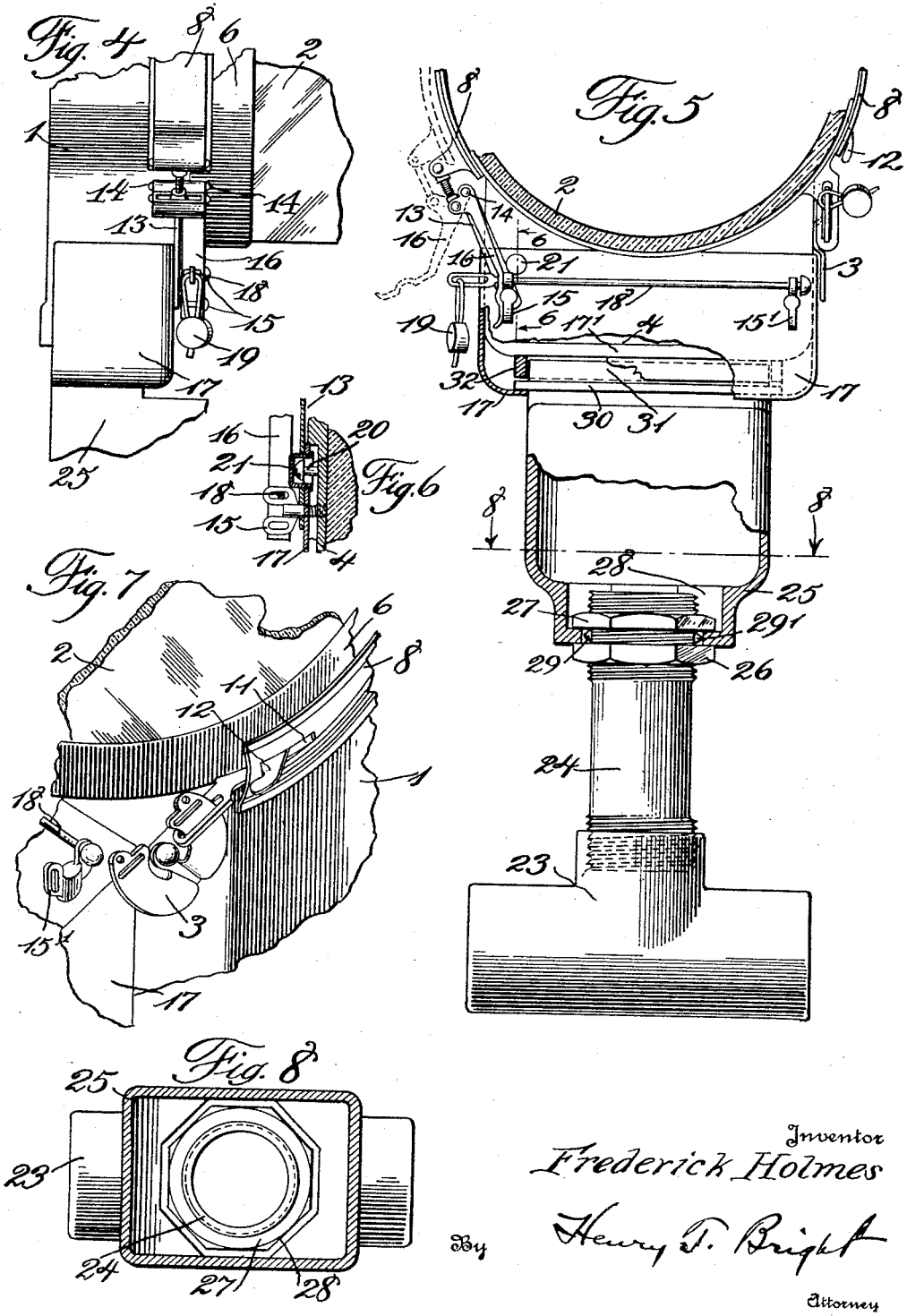

1,893,550

UNITED STATES PATENT OFFICE

FREDERICK HOLMES, OF LA FAYETTE, INDIANA, ASSIGNOR TO DUNCAN ELECTRIC MANUFACTURING COMPANY, OF LA FAYETTE, INDIANA, A CORPORATION OF ILLINOIS

ELECTRICITY METER SERVICE INSTALLATION

Original application filed May 14, 1930, Serial No. 452,323. Divided and this application filed May 18, 1931. Serial No. 538,352.

My invention relates to electricity meter service installations and is particularly adapted and useful in effecting outdoor installations of meters of the general type shown in my prior application 452,323, filed May 14, 1930, of which this application is a division.

It is the purpose of my present invention to provide improved means for coupling the base and preferably the terminal chamber of a meter, where such terminal chamber is employed, with a conduit through which the wiring is passed that connects the meter in service, whereby the wiring at the meter may be exposed for manipulation and testing and may be concealed to guard against access thereto. Where a meter of special outdoor construction is used, it is costly to provide a method of testing in situ as required by most public service commissions. Moreover such specialized outdoor meters cannot readily be interchanged with meters of common indoor construction. In carrying out this object of my invention I employ a housing through which the circuit conductors may be passed to the meter. This housing is normally held in assembly preferably with the terminal chamber of the meter, said terminal chamber or chamber base having a cover which prevents disassembly of the housing from the terminal chamber when the cover is closed and sealed. When this cover is unsealed and displaced the housing is free to become separated from the terminal chamber. The condiut is suitably assembled with the housing and desirably terminates therein, the housing being movable along the conduit when it is free to become disassembled from the terminal chamber. In the preferred embodiment of the invention the conduit is inclusive of an upright nipple which is screwed into the conduit at the lower end of the nipple, means being provided for preventing rotation of the nipple while the housing and meter chamber are assembled.

I preferably so design the meter that one terminal chamber cover may be employed for indoor installations and another terminal chamber cover for outdoor locations, the terminal chamber permitting the substitution of either cover for the other. The parts employed in outdoor installation may readily be omitted to permit the indoor terminal chamber cover to be used for indoor installation. One meter is thus adapted for either indoor or outdoor installation.

I will explain my invention more fully by reference to the accompanying drawings in which Fig. 1 is a side view, with parts in section and broken away, of the preferred embodiment of the invention showing the housing lowered and the terminal chamber cover removed; Fig. 2 is a side elevation of the meter associated with a conduit system for outdoor installation, parts being broken away; Fig. 3 is a sectional view on line 3—3 of Fig. 2; Fig. 4 is a fragmentary view in side elevation showing the preferred method of sealing the protecting band; Fig. 5 is a front elevation partly in section of the meter and equipment of Fig. 2; Fig. 6 is a fragmentary sectional view on line 6—6 of Fig. 5; Fig. 7 is a fragmentary perspective view showing the preferred method of sealing the glass cover, the main cover, of the meter and the attachment of one end of the protecting band to such cover; Fig. 8 is a sectional view on line 8—8 of Fig. 5; Fig. 9 is a side elevation showing the preferred method of protecting the conduit system against the entrance of water and guarding against theft of current when the meter is removed, parts being broken away and shown in section; Fig. 10 is a front elevation of the structure shown in Fig. 9; Fig. 11 is a sectional plan view of an alternative theft guarding arrangement; Fig. 12 is an elevation partly in section of the structure shown in Fig. 11; and Fig. 13 is an elevation of the preferred terminal chamber cover for indoor installations.

The meter illustrated is a single phase alternating current induction electricity watthour meter, but it is obvious that the invention may also be used in connection with meters of other types and construction.

An alternating current watthour meter of a type commonly used is provided with a hollow metallic meter base 1 that supports the motor and measuring elements of the meter, and a glass cover portion 2 constituting the main cover of the meter for said elements. This cover and base thus constitute a chamber for the motor and measuring elements of the meter. A meter of this general type is disclosed in Patent 1,664,673 issued to Albert L. Emens April 3, 1928. The meter shown herein also includes a sealing bar 3, a metallic terminal chamber 4, and mounting screws 5, 5' and 5². This terminal chamber is a downward extension of the meter base 1. A composite metallic band composed of parts 6 and 7 is permanently assembled with the glass cover portion 2 and may be separably assembled, as by means of bayonet projection and slot formations, with the meter base. The band 6, 7 and the glass portion 2 constitute the main meter cover. This feature forms no novel part of my invention. Another metallic band 8, preferably arcuate, covers the joint made between the metallic bands 6 and 7 and the meter base 1 in such a way as to prevent rain from gaining access to the interior of the meter through the gasket 9 which seals the opposed faces of cover portion 2 and the meter base 1. Any water which might pass between the meter base 1 and the metallic band 8 would be received in the comparatively open arcuate space 10 that is afforded by the convex shape of the band 8 from which space the water would flow quickly at the ends of this band and without entering the meter cover or base. Water is carried away from the parts below the band 8 so rapidly by the force of gravity that it has no opportunity to enter the meter through the lower portion of the band 6, 7 that is uncovered by the band 8.

One end of the band 8 has an aperture 11 which receives the lug 12 on the band 6 of the meter cover. The other end of the band 8 is provided with a toggle mechanism of which the bar 13 is assembled with the pin 14 at the upper end of the bar, the lower end of this bar being penetrated by the shank of a thumb screw 15 that is screwed into the body of the terminal chamber 4. The shank of this thumb screw serves as a pivot for the lower end of the arm 13. The shoulder of thumb screw 15 clamps the outdoor chamber cover 17 against the body of terminal chamber 4 without preventing the arm 13 from turning freely. The toggle arm 16 is drawn down against the thumb screw 15 and may be sealed with the sealing bar 18 which is passed through holes provided in this arm, the wings of thumb screw 15 and another thumb screw 15' that also is screwed into the terminal chamber holds cover 17 to the terminal chamber. Any type of seal may be used, but I have chosen to illustrate a lead seal 19. When the toggle mechanism has been manipulated as just described, the band 8 is tightened for the purpose stated. When the sealing bar 18 has been applied the toggle mechanism is locked in its band tightening position, whereby the main meter cover is further secured to the meter base and in a manner to guard the joint between this cover and base and to afford the passage 10 for the drainage of water. When the outdoor cover 17 is to be removed and replaced by the indoor cover the sealing rod 18 is removed and the thumb screws 15 withdrawn.

In Figs. 5 and 6, the terminal chamber outdoor cover 17 is shown as carrying a cup portion 21 which receives the headed stud 20 which is carried by the body of the terminal chamber. This stud serves as a hinge for the regular terminal chamber cover 22 shown in Fig. 13 when the meter is used for regular indoor installations. This cover 22 and said stud are separably assembled at the key hole slot 21' in said cover, the head of the stud being insertible through the larger end of said slot whereafter the cover is shifted endwise to place the shank of the stud in the smaller end of said slot. The structure heretofore described embodies the claimed substance of my prior application 452,323.

Before the meter of my invention is installed, the installer will run his conduit on the outside of the building and in it will place a T 23. I supply a conduit section or nipple 24 which is to be screwed into the stem of the T 23. The upper end of the nipple 23 is passed through an opening in the bottom of metallic housing 25 which is confined between nuts 26 and 27 on the nipple. I cut away the portion of the nipple between its threaded ends in order that the nut 26 may be dropped near the T to permit the housing 25 to be dropped close to the T, Fig. 1. The threading at the upper end of the nipple is straight cut while the threading in the T and the lower end of the nipple is a tapered pipe thread, that is the threading at the bottom of the nipple downwardly tapers the lower end of the nipple to limit the extent to which the nipple may be screwed downwardly into the T. As the nut 26 serves to provide good electrical contact between the metallic conduit system that includes the T 23 and the metallic housing 25, I preferably make the nut 26 of brass or some other non-rusting material which will not require finish and likewise since the upper threads of nipple 24 will be used from time to time, I prefer to make the nipple 24 of a non-corrosive substance, such as aluminum. The polygonal nut 27 fits into a corresponding polygonal recess 28 in the bottom of housing 25. If an attempt be made to turn nipple 24 in a counterclockwise direction as viewed from the top while the housing 25 is in the position shown in Fig. 2, the short screws 29 and 29', which are screwed into the nipple 24, and then riveted over inside and outside the nipple 24 will be brought up against nut 27 that is held from rotation in recess 28, whereby the nipple is held from material rotation. The upright nipple 24 cannot be turned in clockwise direction as viewed from above because of the tapered pipe thread which I provide at the lower end of the nipple and the upper end of T 23. Housing 25 is provided with a projecting shoulder or flange 30. This shoulder is engaged by the terminal chamber cover 17 when both are in the position shown in Figs. 2, 4 and 5. Nut 26 can, of course, be lowered by anyone desiring to gain access to the wiring, but such action will be of no avail as long as the seal 19 is left intact.

Housing 25 has a four-sided extension or rim 31 which extends upwardly into the hollow downwardly projecting flange 32 of the terminal chamber extension 4 of base 1. The flange 32, therefore, completely encircles the rim 31, thus amply safe-guarding the conduit system against the entrance of rain. The terminal chamber cover 17 is rendered proof against the entrance of rain by means of the gasket 33 which fits between the terminal chamber cover 17 and a rim 17' which goes completely around and is provided upon the front of the terminal chamber 4. The thumb screws 15 and 15' serve to compress the gasket 33 between the cover 17 and the rim 17'.

The nipple 24 is assembled with the housing 25 at the factory. The nut 27 as well as the screws 29 and 29' are also placed in position at the factory. In connecting the meter with the conduit element 23, the nipple 24 is first screwed home to the limit permitted by the tapering pipe thread at the bottom of the nipple and during this operation the housing 25 and the nut 26 are lowered but held sufficiently high to provide a pipe wrench hold on the unthreaded portion of the nipple. After the meter has been mounted, housing 25 will be raised into the position shown in Figs. 2 and 5, the terminal chamber cover 17, the thumb screws 15 and 15', and the sealing bar 18 with seal 19, will be put in place as illustrated in Fig. 5.

If it is desired to test the meter, it will simply be necessary to break the seal 19, take out the sealing bar 18, remove the thumb screws 15 and 15', also the terminal chamber cover 17, and back off the nut 26. The housing 25 will then be lowered and the terminals of the meter, in the meter terminal chamber, will be accessible for any type of test that may be desired.

It will also be readily understood that if test facilities are provided in the terminal chamber of the meter it will be entirely unnecessary to lower housing 25 unless the meter is to be disconnected and removed. It is also apparent that a test block may be mounted so as to be supported by the binding posts of the meter and so as to extend downwardly into the housing 25 when the meter is in the position shown in Fig. 2 and that this test block will be accessible when the housing is lowered.

If the meter is disconnected and removed it will be necessary to protect the conduit system against the entrance of rain and the wiring against theft of current. I have, therefore, provided a cap in the form of a casting 34 (Figs. 9 and 10) which is provided with mounting holes 35 so that it may be secured to the wall in the same manner as the watt-hour meter; that is to say, the location of the holes 35 is exactly the same as the location of the two lower mounting screw holes of the terminal chamber 4. The cap 34 receives the housing extension 31 and engages the flange 30 of the housing 25.

In Figs. 11 and 12, I have illustrated one of many alternative constructions for the ends accomplished by the nut 27 and riveted screws 29 and 29'. The screws $29^2$ and $29^3$ are screwed into the upper end of the nipple 24 and serve to hold the oval shaped washer 27' in position. The oval shaped recess 28' cooperates with the washer 27' to prevent counterclockwise motion as viewed from above of the nipple 24 when the housing 25 is in its raised position.

When the meter is to be used indoors, the nipple 24, housing 25, terminal chamber cover 17, and thumb screws 15 and 15' may be dispensed with and the terminal chamber cover 22 shown in Fig. 13 substituted for terminal chamber cover 17.

In my preferred construction, the cost is low, the appearance neat, the meter may be tested in situ, and meters of the same construction may be used for outdoor or indoor installation or employed interchangeably with any of the types of indoor meters in common use. Although the movable housing of my preferred embodiment is small and neat in appearance, it is, nevertheless, large enough to permit the use of a test block to facilitate testing, but such a block is not necessary for the purpose of testing the meter in situ.

I claim:

1. In an electricity meter service installation the combination of a meter base having a cover; a housing separate from the base and through which circuit conductors may be passed to a meter, said cover and housing having formations interengageable when the cover is applied to hold the housing and base in assembly and means independent of the housing detachably securing the cover to the base.

2. In an electricity meter service installation the combination of a meter base having an extension constituting a terminal chamber, this chamber having a downwardly projecting flange; a cover for said terminal chamber having a portion extending and terminating beneath said flange; and a movable housing through which circuit conductors may be passed to the meter, said housing having a shoulder interposed between the aforesaid downwardly projecting flange and the portion of the cover which extends beneath the flange.

3. In an electricity meter service installation the combination of a meter base having an extension constituting a terminal chamber; a cover for said terminal chamber and having a portion extending beneath said chamber; a movable housing through which circuit conductors may be passed to the meter, said housing having a shoulder which extends between the terminal chamber and said portion of the cover, and means independent of the housing detachably securing the cover to the terminal chamber.

4. In an electricity meter service installation the combination of a base having an extension constituting a terminal chamber; a cover for said terminal chamber; a movable housing through which circuit conductors may be passed to the meter, said cover and housing, when the cover is applied, having interengaging formations serving to prevent disassembly of the housing from the terminal chamber, and means independent of the housing detachably securing the cover to the terminal chamber.

5. In an electricity meter service installation the combination of a base having an extension constituting a terminal chamber; a cover for said terminal chamber; a movable housing through which circuit conductors may be passed to the meter, said cover and housing having interengaging formations serving to prevent disassembly of the housing from the terminal chamber; a conduit for the meter wiring; an upright nipple screwed into the conduit and formed, where screwed into the conduit, to limit the extent to which it may be downwardly screwed; a nut screwed upon the upper end of the nipple to be adjacent the bottom of the housing the nipple being formed to permit this nut to be lowered to permit the housing to be lowered following the removal of the aforesaid cover; and means for preventing material turning of the nipple when the housing is in assembly with the meter terminal chamber.

6. In an electricity meter service installation the combination of a base having an extension constituting a terminal chamber; a cover for said terminal chamber; a movable housing through which circuit conductors may be passed to the meter, said cover and housing having interengaging formations serving to prevent disassembly of the housing from the terminal chamber; a conduit for the meter wiring; an upright nipple screwed into the conduit at the lower end of the nipple, the upper end of the nipple passing through the bottom of the housing; and means for preventing rotation of the nipple when the housing and the meter terminal chamber are assembled.

7. In an electricity meter service installation the combination of a base having an extension constituting a terminal chamber; a cover for said terminal chamber; a conduit for the meter wiring; and a movable housing through which circuit conductors may be passed from said conduit to the meter, the part of the conduit from which the circuit conductors pass into the housing entering said housing, said cover and housing having interengaging formations serving to prevent disassembly of the housing from the terminal chamber, said housing being movable along the part of the conduit that enters it when the cover is shifted to permit the housing to be disassembled from the terminal chamber.

8. In an electricity meter service installation, the combination of a meter base, a removable cover element for the base, a housing separate from the base through which conductors may be passed to a meter, said cover element and housing having formations interengageable when the cover element is applied to hold the housing and base in assembly, a conduit for meter wiring, and an upright tubular nipple having one end secured to said conduit and its other end loosely engaged through a wall of the housing; whereby the latter may be moved on the nipple away from the base when the cover element is removed.

9. In an electricity meter service installation, the combination of a meter base, a housing separate from the base through which conductors may be passed to meter connections, a conduit for meter wiring, an upright tubular nipple having one end secured to said conduit and its other end loosely engaged through a wall of the housing; whereby the latter may be moved on the nipple away from the base, and releasable means for restraining the housing against said movement.

10. In an electricity meter service installation, the combination of a meter base, a housing separate from the base through which conductors may be passed to meter connections, a conduit for meter wiring, an upright tubular nipple having one end secured to said conduit and its other end loosely engaged through a wall of the housing, whereby the latter may be moved on the nipple away from the base, and releasable means on the nipple for restraining the housing against said movement.

11. In an electricity meter service installation, the combination of a meter base, a housing separate from the base through which conductors may be passed to meter connections, a conduit for meter wiring, an upright tubular nipple having its end portions exteriorly threaded and its exterior diameter between said threaded end portions reduced, one end of said nipple being secured to said conduit and the other end loosely engaged through a wall of the housing whereby the latter may be moved on the nipple away from the base, and a nut on the nipple for cooperation with the threads on the end thereof adjacent the base to restrain said housing against said movement.

12. In an electricity meter service installation, the combination of a meter base, a housing separate from the base through which conductors may be passed to meter connections, a conduit for meter wiring, an upright tubular nipple having one end secured to said conduit and its other end loosely engaged through a wall of the housing, whereby the latter may be moved on the nipple away from the base, and means securing the housing and nipple against disconnection from each other when the former is disconnected from the base and the latter disconnected from the conduit.

13. In an electricity meter service installation, the combination of a meter base, a removable cover element for the base, a housing separate from the base through which conductors may be passed to a meter, and a support with which said housing is engaged for movement to and from assembled relation with respect to the base, and said cover and housing having formations interengageable when the cover element is applied to hold the housing in assembled relation to the base.

14. In an electricity meter service installation, the combination of a meter base, a housing separate from the base through which conductors may be passed to meter connections, a conduit for meter wiring, an upright tubular nipple having its end portions exteriorly threaded, one end of said nipple being secured to said conduit and the other end loosely engaged through the wall of the housing whereby the latter may be moved on the nipple away from the base, and a nut on the nipple for cooperation with the threads on the end thereof adjacent the base to restrain said housing against said movement, the exterior diameter of the nipple inwardly of its threaded end adjacent the housing being reduced to permit free sliding movement of the nut thereon toward its opposite end when said nut is disengaged from its related threads to thereby permit further movement of the housing on the nipple away from the base.

15. In an electricity meter service installation, the combination of a meter base, a housing through which conductors may be passed to meter connections, and a support with which the housing is engaged for movement to end from assembled relation to the base without disengagement from the support.

16. In an electricity meter service installation, the combination of a meter base, a housing separate from the base through which conductors may be passed to meter connections, a conduit for meter wiring, an upright tubular nipple having one end secured to said conduit and its other end loosely engaged through a wall of the housing whereby the latter may be moved on the nipple toward and away from the base, means for supporting the housing on the nipple in assembled relation to the base, and means for locking the nipple and housing against relative rotation when the latter is in assembled relation to the base.

17. In an electricity meter service installation, the combination of a meter base, a housing separate from the base through which conductors may be passed to meter connections, a conduit for meter wiring, an upright tubular nipple having one end secured to said conduit and its other end loosely engaged through a wall of the housing whereby the latter may be moved on the nipple toward and away from the base, means for supporting the housing in assembled relation to the base, and means for locking the nipple and housing against relative rotation when the latter is in assembled relation to the base.

18. In an electricity meter service installation, the combination of a meter base, a housing separate from the base through which conductors may be passed to meter connections, a conduit for meter wiring loosely engaged through a wall of the housing whereby the latter may be moved with respect to the base without disengagement from the conduit, and releasable means restraining the housing against said movement.

In testimony whereof I hereunto affix my signature.

FREDERICK HOLMES.